(12) United States Patent
Landais

(10) Patent No.: US 11,997,750 B2
(45) Date of Patent: May 28, 2024

(54) COMMUNICATION SYSTEM

(71) Applicant: NOKIA TECHNOLOGIES OY, Espoo (FI)

(72) Inventor: Bruno Landais, Pleumeur-Bodou (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 348 days.

(21) Appl. No.: 17/267,433

(22) PCT Filed: Aug. 10, 2018

(86) PCT No.: PCT/EP2018/071808
§ 371 (c)(1),
(2) Date: Feb. 9, 2021

(87) PCT Pub. No.: WO2020/030287
PCT Pub. Date: Feb. 13, 2020

(65) Prior Publication Data
US 2021/0321245 A1    Oct. 14, 2021

(51) Int. Cl.
*H04L 61/4541* (2022.01)
*H04L 61/4511* (2022.01)
*H04W 8/06* (2009.01)
*H04W 60/00* (2009.01)
*H04W 60/04* (2009.01)

(52) U.S. Cl.
CPC .......... *H04W 8/06* (2013.01); *H04L 61/4511* (2022.05); *H04W 60/00* (2013.01)

(58) Field of Classification Search
None
See application file for complete search history.

(56) References Cited

U.S. PATENT DOCUMENTS

| | | | |
|---|---|---|---|
| 10,764,951 B2 * | 9/2020 | Park | H04W 12/06 |
| 2017/0303259 A1 | 10/2017 | Lee et al. | |
| 2018/0192471 A1 | 7/2018 | Li et al. | |
| 2018/0227871 A1 | 8/2018 | Singh et al. | |
| 2021/0204103 A1 * | 7/2021 | Bartolomé Rodrigo | H04L 63/0428 |
| 2021/0306875 A1 * | 9/2021 | Zhang | H04W 24/02 |

FOREIGN PATENT DOCUMENTS

| | | | | |
|---|---|---|---|---|
| CN | 101411135 A | | 4/2009 | |
| CN | 110324807 A | * | 10/2019 | H04L 61/1511 |

OTHER PUBLICATIONS

CN110324807A filed on Mar. 27, 2018, pp. 1-50.*
International Search Report & Written Opinion dated Apr. 17, 2019 corresponding to International Patent Application No. PCT/EP2018/071808.

(Continued)

*Primary Examiner* — Ajit Patel
(74) *Attorney, Agent, or Firm* — SQUIRE PATTON BOGGS (US) LLP

(57) ABSTRACT

Information for an access and mobility management function is received at a network repository function. At least part of the information for the access and mobility management function is stored at a domain name server, caused by the network repository function.

19 Claims, 6 Drawing Sheets

(56) References Cited

OTHER PUBLICATIONS

3GPP TR 29.891 V15.0.0 (Dec. 2017), Technical Report, 3rd Generation Partnership Project; Technical Specification Group Core Network and Terminals; 5G System—Phase 1; CT WG4 Aspects (Release 15), Jan. 29, 2018, XP051384057.

3GPP TS 23.501 V15.2.0 (Jun. 2018), Technical Specification, 3rd Generation Partnership Project; Technical Specification Group Services and System Aspects; System Architecture for the 5G System; Stage 2 (Release 15), Jun. 19, 2018, XP051472860.

Huawei et al, "AMF Name and AMF N2AP UE ID," 3GPP Draft; 23501_CR0270_5GS_PH1_(REL-15)_S2-183441_CR 23051 AMF Name R1.1, Sanya, China, Jun. 10, 2018, XP051458190.

Huawei et al., "Ol#27: TS23.501: Update NRF to support AMF management," 3GPP Draft; S2-179435, SA WG2 Meeting #124, Reno, Nevada, USA, Dec. 4, 2017, XP051380056.

S. Cheshire et al., "DNS-Based Service Discovery," Internet Engineering Task Force (IETF), RFC 6763, Feb. 20, 2013, pp. 1-49, XP015090290.

China Mobile et al, "Agreement on the overall architecture," 3GPP Draft; S2-166381, SA WG2 Meeting #118, Reno, Nevada, USA, Nov. 14, 2016, XP051184940.

First Examination Report dated Jan. 11, 2022 corresponding to Indian Patent Application No. 202147005244.

Communication pursuant to Article 94(3) EPC dated Apr. 11, 2022 corresponding to European Patent Application No. 18756181.6.

NTT Docomo, "UDM NG7 interface (NG7) should be a Point to Point Interface," S2-166646, SA WG2 Meeting #118, Reno, USA, Nov. 14-18, 2016.

3GPP TS 23.501 V0.4.0 (Apr. 2017), Technical Specification, 3rd Generation Partnership Project; Technical Specification Group Services and System Aspects; System Architecture for the 5G System; Stage 2 (Release 15), Apr. 2017.

First Office Action issued in corresponding Chinese Patent Application No. 201880096503.X dated Dec. 26, 2023, with a concise English language summary thereof.

* cited by examiner

LEGEND
300: Apparatus
301: Memory
302: Processing Unit
303: Processing Unit
304: I/O Interface

1

COMMUNICATION SYSTEM

FIELD

The present application relates to a method, apparatus, and computer program.

BACKGROUND

A communication system can be seen as a facility that enables communication sessions between two or more entities such as user terminals, base stations/access points and/or other nodes by providing carriers between the various entities involved in the communications path. A communication system can be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to one aspect, there is provided an apparatus in a network repository function comprising means for: receiving information for an access and mobility management function; and causing at least a part of said information for said access and mobility management function to be stored at a domain name server.

The information may comprise at least one of address information and name information of said access and mobility management function.

The address information may be dynamic.

The address information may be for an interface of said access and mobility management function towards an access network.

The address information may comprise one or more IP addresses.

The information may be received in a message from said access and mobility management function.

The information may be received during one of a registration process an update process.

The information may be provided as part of profile information of said access and mobility management function.

The means may be for causing information on a set of access and mobility management functions to be provided to said domain name server such that said domain name server has information on available access and mobility management functions of said set.

According to another aspect, there is provided an apparatus in a network repository function comprising means for: receiving deregistration information for an access and mobility management function; and causing at least a part of said information for said access and mobility management function stored at a domain name server to be removed from said domain name server.

The information may comprise at least one of address information and name information of said access and mobility management function.

The address information may be dynamic.

The address information may be for an interface of said access and mobility management function towards an access network.

The address information may comprise one or more IP addresses.

The information may be received in a message from said access and mobility management function.

The information may be provided as part of profile information of said access and mobility management function.

The means may be for causing information on a set of access and mobility management functions to be provided to said domain name server such that said domain name server has information on available access and mobility management functions of said set.

According to another aspect, there is provided an apparatus in an access and mobility management function comprising means for: causing information for said access and mobility management function to be transmitted to a network repository function, said information comprising address information of an interface of said access and mobility management function, said interface being towards an access network.

The information may further comprise name information of said access and mobility management function.

The address information may be dynamic.

The address information may comprise one or more IP addresses.

The information may be provided during one of a registration process, a de-registration process and an update process.

The information may be provided as part of profile information of said access and mobility management function.

According another aspect there is provided an apparatus in an access network comprising means for: causing a request to be sent to a domain name server for address information for a plurality access and mobility management functions, said address information being for respective interfaces of respective access and mobility management functions, each interface being towards said access network; and receiving a response with said address information associated with a plurality of access and mobility management functions.

The plurality of access and mobility management functions may comprise a set of access and mobility management functions and said means is for determining said set of access and mobility management functions.

The request may be for initiating a straight forward name authority pointer procedure for said set of access and mobility management functions.

The response may comprise name authority pointer records comprising said address information for respective access and mobility management functions of said set.

The response may comprise name authority pointer records comprising said address information for respective access and mobility management functions which are currently available in said set.

The means may be for selecting an access and mobility management function from said plurality of an access and mobility management function for which address information is received.

According to another aspect, there is provided an apparatus in a network repository function, said apparatus comprising: at least one processor; and at least one memory including computer program code, the at least one memory and the computer program code configured to, with the at least one processor, cause the apparatus at least to: receive information for an access and mobility management function; and cause at least a part of said information for said access and mobility management function to be stored at a domain name server.

The information may comprise at least one of address information and name information of said access and mobility management function.

The address information may be dynamic.

The address information may be for an interface of said access and mobility management function towards an access network.

The address information may comprise one or more IP addresses.

The information may be received in a message from said access and mobility management function.

The information may be received during one of a registration process, a de-registration process and an update process.

The information may be provided as part of profile information of said access and mobility management function.

According to another aspect, there is provided an apparatus in a network repository function, said apparatus comprising: at least one processor; and at least one memory including computer program code, the at least one memory and the computer program code configured to, with the at least one processor, cause the apparatus at least to: receive deregistration information for an access and mobility management function; and cause at least a part of said information for said access and mobility management function stored at a domain name server to be removed from said domain name server.

The information may comprise at least one of address information and name information of said access and mobility management function.

The address information may be dynamic.

The address information may be for an interface of said access and mobility management function towards an access network.

The address information may comprise one or more IP addresses.

The information may be received in a message from said access and mobility management function.

The information may be provided as part of profile information of said access and mobility management function.

The at least one memory and the computer program code may be configured to, with the at least one processor, cause the apparatus to cause information on a set of access and mobility management functions to be provided to said domain name server such that said domain name server has information on available access and mobility management functions of said set.

According to another aspect, there is provided an apparatus in an access and mobility management function, said apparatus comprising: at least one processor; and at least one memory including computer program code, the at least one memory and the computer program code configured to, with the at least one processor, cause the apparatus at least to: cause information for said access and mobility management function to be transmitted to a network repository function, said information comprising address information of an interface of said access and mobility management function, said interface being towards an access network.

The information may further comprise name information of said access and mobility management function.

The address information may be dynamic.

The address information may comprise one or more IP addresses.

The information may be provided during one of a registration process, a de-registration process and an update process.

The information may be provided as part of profile information of said access and mobility management function.

According to another aspect, there is provided an apparatus in an access network, said apparatus comprising: at least one processor; and at least one memory including computer program code, the at least one memory and the computer program code configured to, with the at least one processor, cause the apparatus at least to: cause a request to be sent to a domain name server for address information for a plurality access and mobility management functions, said address information being for respective interfaces of respective access and mobility management functions, each interface being towards said access network; and receive a response with said address information associated with a plurality of access and mobility management functions.

The plurality of access and mobility management functions may comprise a set of access and mobility management functions and said means is for determining said set of access and mobility management functions.

The request may be for initiating a straight forward name authority pointer procedure for said set of access and mobility management functions.

The response may comprise name authority pointer records comprising said address information for respective access and mobility management functions of said set.

The response may comprise name authority pointer records comprising said address information for respective access and mobility management functions which are currently available in said set.

The at least one memory and the computer program code may be configured to, with the at least one processor, cause the apparatus to select an access and mobility management function from said plurality of an access and mobility management function for which address information is received.

According to another aspect, there is provided a method in a network repository function comprising: receiving information in a network repository function for an access and mobility management function; and causing, by said network repository function, at least a part of said information for said access and mobility management function to be stored at a domain name server.

The information may comprise at least one of address information and name information of said access and mobility management function.

The address information may be dynamic.

The address information may be for an interface of said access and mobility management function towards an access network.

The address information may comprise one or more IP addresses.

The information may be received in a message from said access and mobility management function.

The information may be received during one of a registration process and an update process.

The information may be provided as part of profile information of said access and mobility management function.

The method may comprise causing information on a set of access and mobility management functions to be provided to said domain name server such that said domain name server has information on available access and mobility management functions of said set.

According to an aspect, there is provided a method comprising: receiving, in a network repository function, deregistration information for an access and mobility management function; and causing, by a network repository function, at least a part of said information for said access and mobility management function stored at a domain name server to be removed from said domain name server.

The information may comprise at least one of address information and name information of said access and mobility management function.

The address information may be dynamic.

The address information may be for an interface of said access and mobility management function towards an access network.

The address information may comprise one or more IP addresses.

The information may be received in a message from said access and mobility management function.

The information may be provided as part of profile information of said access and mobility management function.

The method may comprise causing information on a set of access and mobility management functions to be provided to said domain name server such that said domain name server has information on available access and mobility management functions of said set.

According to another aspect, there is provided a method comprising: causing, in an access and mobility management function, information for said access and mobility management function to be transmitted to a network repository function, said information comprising address information of an interface of said access and mobility management function, said interface being towards an access network.

The information may further comprise name information of said access and mobility management function.

The address information may be dynamic.

The address information may comprise one or more IP addresses.

The information may be provided during one of a registration process, a de-registration process and an update process.

The information may be provided as part of profile information of said access and mobility management function.

According to another aspect, there is provided a method comprising: causing, in an access network, a request to be sent to a domain name server for address information for a plurality access and mobility management functions, said address information being for respective interfaces of respective access and mobility management functions, each interface being towards said access network; and receiving a response with said address information associated with a plurality of access and mobility management functions.

The plurality of access and mobility management functions may comprise a set of access and mobility management functions and said means is for determining said set of access and mobility management functions.

The request may be for initiating a straight forward name authority pointer procedure for said set of access and mobility management functions.

The response may comprise name authority pointer records comprising said address information for respective access and mobility management functions of said set.

The response may comprise name authority pointer records comprising said address information for respective access and mobility management functions which are currently available in said set.

The method may comprise selecting an access and mobility management function from said plurality of an access and mobility management function for which address information is received.

An apparatus may comprise means for performing the actions of the method as described above.

An apparatus may be configured to perform the actions of the method as described above.

In another aspect there is provided a non-transitory computer readable medium comprising program instructions thereon for performing at least the following: receiving information in a network repository function for an access and mobility management function; and causing, by said network repository function, at least a part of said information for said access and mobility management function to be stored at a domain name server.

In another aspect there is provided a non-transitory computer readable medium comprising program instructions thereon for performing at least the following: receiving, in a network repository function, deregistration information for an access and mobility management function; and causing, by a network repository function, at least a part of said information for said access and mobility management function stored at a domain name server to be removed from said domain name server.

In another aspect there is provided a non-transitory computer readable medium comprising program instructions thereon for performing at least the following: causing, in an access and mobility management function, information for said access and mobility management function to be transmitted to a network repository function, said information comprising address information of an interface of said access and mobility management function, said interface being towards an access network.

In another aspect there is provided a non-transitory computer readable medium comprising program instructions thereon for performing at least the following: causing, in an access network, a request to be sent to a domain name server for address information for a plurality access and mobility management functions, said address information being for respective interfaces of respective access and mobility management functions, each interface being towards said access network; and receiving a response with said address information associated with a plurality of access and mobility management functions.

In another aspect there is provided a computer program comprising instructions stored thereon for performing at least the following: receiving information in a network repository function for an access and mobility management function; and causing, by said network repository function, at least a part of said information for said access and mobility management function to be stored at a domain name server.

In another aspect there is provided a computer program comprising instructions stored thereon for performing at least the following: receiving, in a network repository function, deregistration information for an access and mobility management function; and causing, by a network repository function, at least a part of said information for said access and mobility management function stored at a domain name server to be removed from said domain name server.

In another aspect there is provided a computer program comprising instructions stored thereon for performing at least the following: causing, in an access and mobility management function, information for said access and mobility management function to be transmitted to a network repository function, said information comprising address information of an interface of said access and mobility management function, said interface being towards an access network.

In another aspect there is provided a computer program comprising instructions stored thereon for performing at least the following: causing, in an access network, a request to be sent to a domain name server for address information for a plurality access and mobility management functions, said address information being for respective interfaces of respective access and mobility management functions, each interface being towards said access network; and receiving a response with said address information associated with a plurality of access and mobility management functions.

A computer program may comprise program instructions for causing a computer to perform the method as described above.

A computer program product stored on a medium may cause an apparatus to perform the method as described herein.

An electronic device may comprise apparatus as described herein.

A chipset may comprise apparatus as described herein.

In the above, various aspects have been described. It should be appreciated that further aspects may be provided by the combination of any two or more of the aspects described above.

Various other aspects and further embodiments are also described in the following detailed description and in the attached claims.

DESCRIPTION OF FIGURES

Embodiments will now be described, by way of example only, with reference to the accompanying Figures in which.

DETAILED DESCRIPTION

In general, the following disclosure relates to an example architecture, with associated apparatus, for a communication system. In particular, the following relates to an architecture and associated apparatus for a service based architecture.

A core network architecture may be service-based architecture (SBA), allowing some network functions (NFs), called NF service producers, to expose services to other authorized NFs, called NF service consumers, through service-based interfaces.

Before explaining in detail the examples, certain general principles of a wireless communication system and mobile communication devices are briefly explained with reference to FIGS. 1 to 2 to assist in understanding the technology underlying the described examples.

Figure 1:
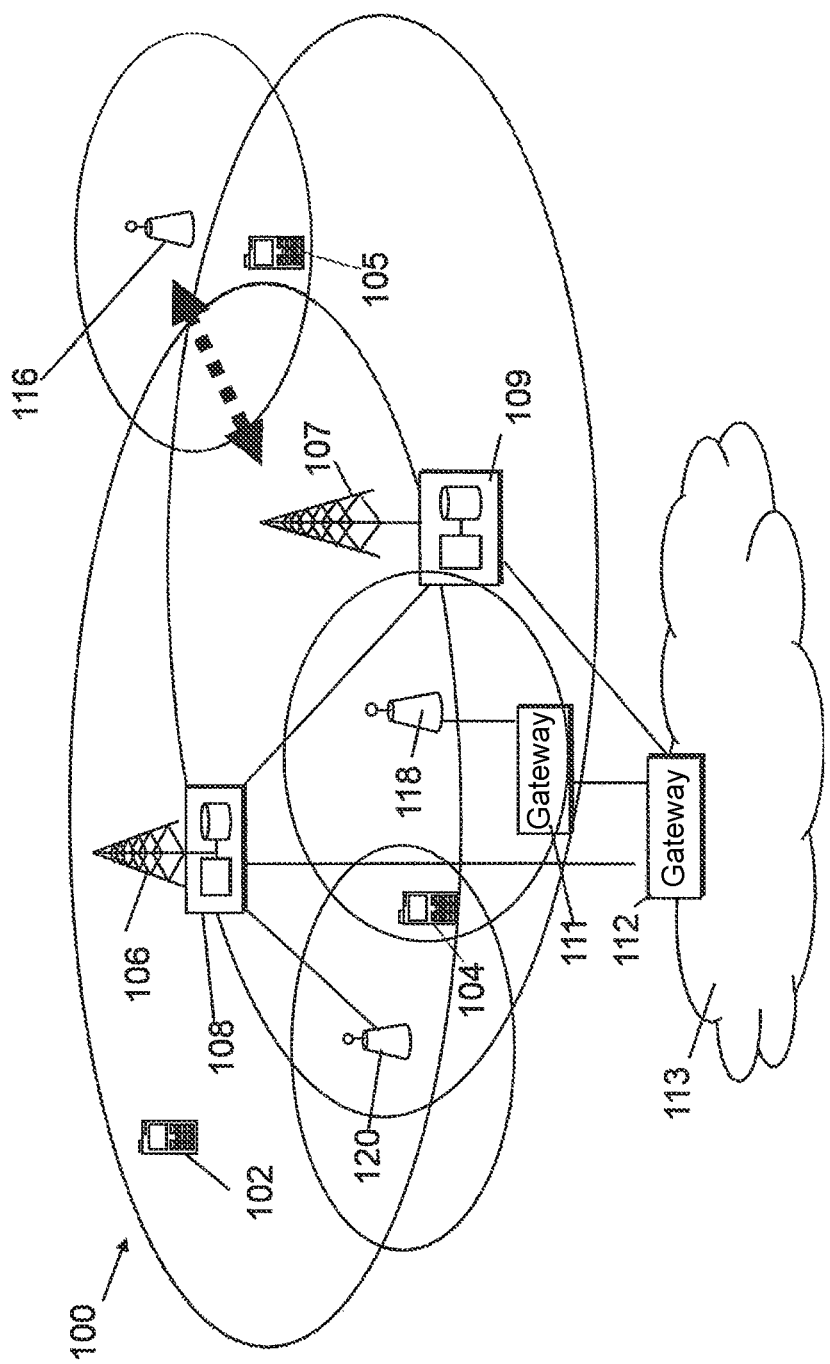
FIG. 1 shows a schematic diagram of an example communication system comprising a plurality of base stations and a plurality of communication devices.

In a wireless communication system 100, such as that shown in FIG. 1, mobile communication devices or user apparatus (UE) 102, 104, 105 are provided wireless access via at least one base station or similar wireless transmitting and/or receiving node or point. A user can access the communication system by means of an appropriate communication device or terminal. A communication device of a user is may be a user equipment (UE) or a machine type terminal or any other suitable device. A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved.

A base station may be referred to more generally as simply a network apparatus or a network access point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

In FIG. 1 base stations 106 and 107 are shown as connected to a wider communications network 113 via gateway 112. A further gateway function 111 may be provided to connect to another network.

There may be smaller base stations or cells 116, 118, 120 in some networks. These may be pico or femto level base stations or the like.

Figure 2:
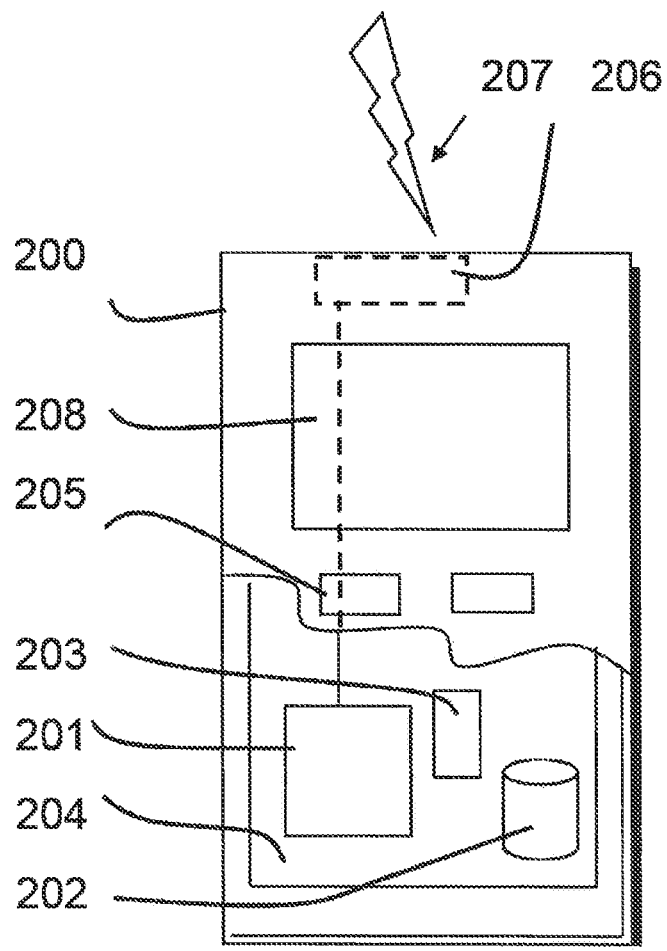
FIG. 2 shows a schematic diagram of an example mobile communication device.

A possible communication device will now be described in more detail with reference to FIG. 2 showing a schematic, partially sectioned view of a communication device 200. Such a communication device may be a user equipment (UE) or terminal. An appropriate communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, a machine type device or any combinations of these or the like.

The device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. This may be optional in some embodiments.

A display 208, a speaker and a microphone can be also provided. One or more of these may be optional in some embodiments.

A communication device may comprise appropriate connectors (either wired or wireless) to other devices and/or for connecting external accessories, for example hands-free equipment, thereto. One or more of these may be optional.

The communication devices may access the communication system based on various access techniques.

An example of wireless communication systems are architectures standardized by the 3rd Generation Partnership Project (3GPP). A latest 3GPP based development is often referred to as 5G. Other examples of radio access system comprise those provided by base stations of systems that are based on technologies such as wireless local area network (WLAN) and/or WiMAX (Worldwide Interoperability for Microwave Access). It should be appreciated that although some embodiments are described in the context of a 5G system, other embodiments may be provided in any other suitable system including but not limited to subsequent systems or similar protocols defined outside the 3GPP forum.

Figure 3:
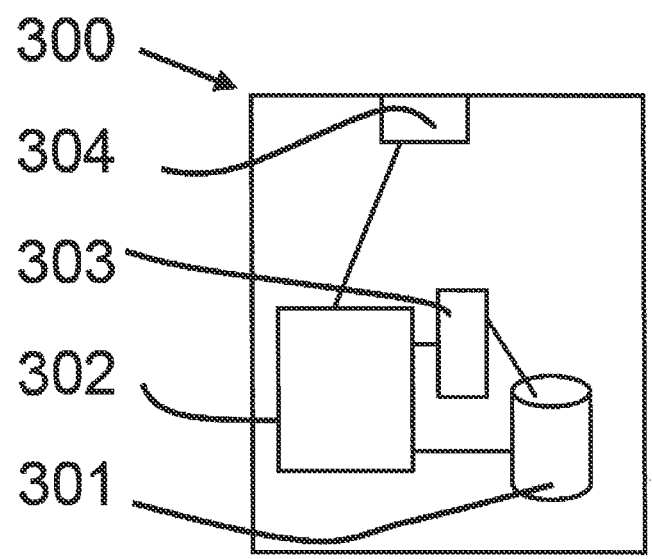
FIG. 3 shows a schematic diagram of an apparatus.

An example apparatus is shown in FIG. 3. FIG. 3 shows an example of an apparatus 300 for a network function such as a network repository function (NRF) or an access and mobility management function or any other suitable function. The apparatus 300 comprises at least one memory 301, at least one data processing unit 302, 303 and an input/output interface 304. For example the apparatus 300 can be configured to execute an appropriate software code to provide functions. The apparatus 300 may be included in a chipset or modem apparatus.

The proposed 5G system supports a service based architecture. A service based architecture utilises a service based framework for a variety of communications-related processes, such as service registration, deregistration, discovery, selection, routing, etc. A service-based architecture is characterised by, instead of having predefined interfaces between network elements, using a services model in which components query a network function repository function (NRF) to discover and communicate with each other over application programming interfaces (APIs). An API is a function and/or procedure that allows the creation of application which access the features or data of an operating system, application or other service.

To support this service architecture, there are described/provided a plurality of functional entities (also known as network functions, NFs). Aside from the above-mentioned NRF, other network functions may comprise one or more of:

Access and mobility management function (AMF): the AMF may provide features relating to UE-based authentication, authorisation, registration, mobility and connection management. The AMF may be independent of access technology type, and so a UE may be connected to an AMF regardless of the access technology used;

Session Management function (SMF): the SMF may provide session management functions, including allocating Internet Protocol (IP) addresses to UEs. If a UE has multiple sessions, different SMFs may be allocated to each session to manage them individually;

Policy control function (PCF): the PCF may use information on the packet flow between two communicating entities to determine policies about mobility and session management for a given UE for the AMF and SMF to enforce this;

Unified data management function (UDM): the UDM may store subscription data for a UE;

Application function (AF): the AF may provide information on the packet flow to the PCF for supporting quality of services; and Authentication server function (AUSF): the AUSF supports authentication of a UE.

Some embodiments may be supported by one or more of the above functions. In some embodiments, one or more of these functions may be as set out in sub clause 6.2 of 3GPP TS 23.501.

In, for example, Rel-15 of the 5G protocol, some network functions (NFs), called NF service producers, expose services to other authorized NFs, called NF service consumers, through a service-based interface.

Figure 4:
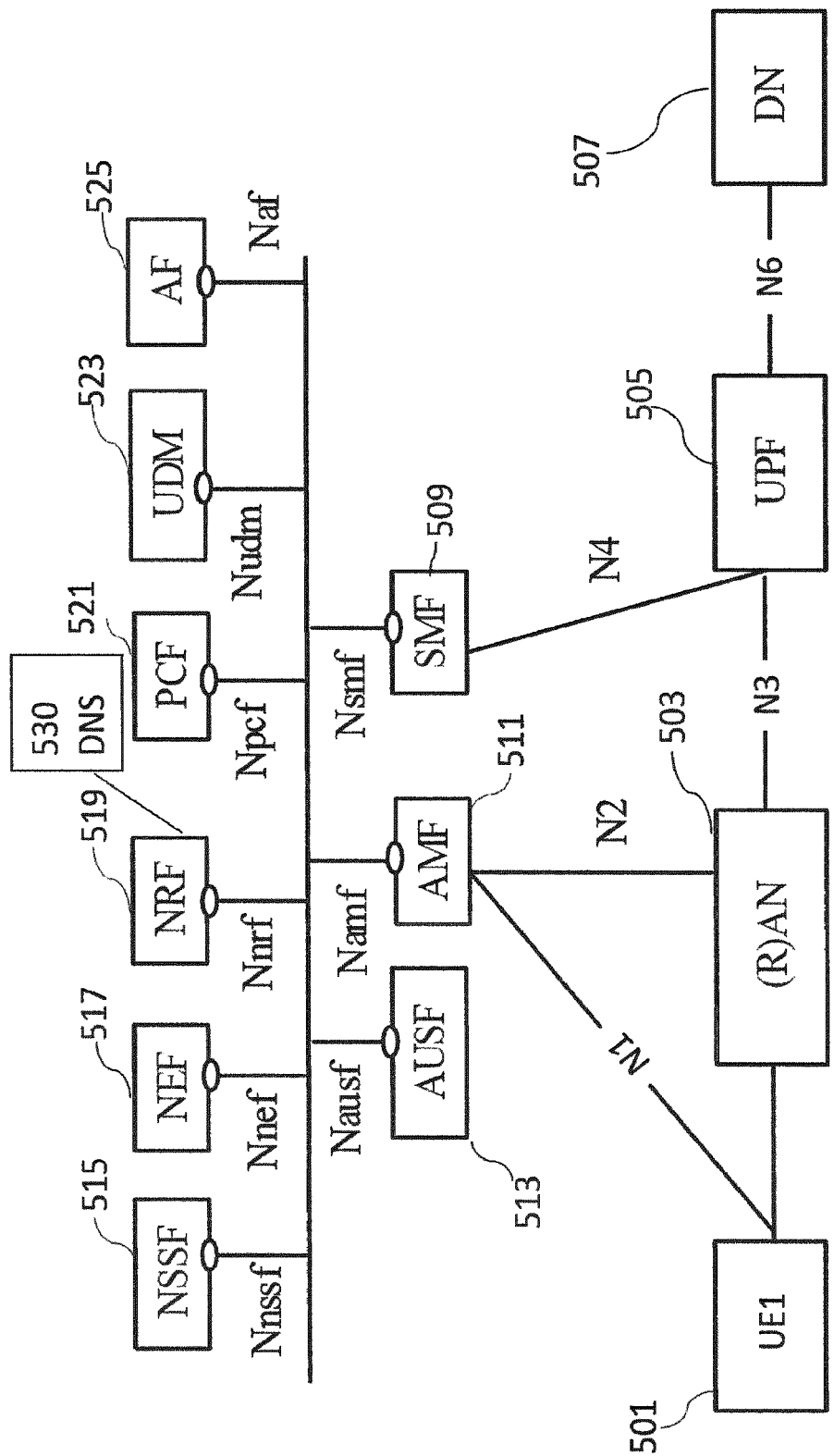
FIG. 4 shows a schematic diagram of a distributed services network.

An example architecture for such a services-based architecture is depicted in FIG. 4.

The architecture shows a user equipment (UE) 501 connected to a (radio) access network ((R) AN or 5G-AN) 503 at the access stratum, as well as an access and mobility management function (AMF) 511 at the non-access stratum. The RAN represents a base station using so-called "new" RAT (radio access technology) and evolved LTE, for example a gNodeB (gNB). An AN (access network) is a general base station including non-3GPP access, e.g., Wi-Fi. A 5G-AN may be a 5G Access Network comprising a NG-RAN and/or non-3GPP AN connecting to a 5G Core Network, e.g. a N3IWF (N3 Interworking Function).

The 5G core network (5GC) consists of various network functions (NFs) as discussed previously. FIG. 4 shows the following 5G core NFs: An access and mobility management function (AMF) 511, a session management function (SMF) 509, a policy control function (PCF) 521, an application function (AF) 525, an authentication server function (AUSF) 513, a user plane function (UPF) 505, unified data management (UDM) 523, a NF repository function (NRF) 519, a network exposure function (NEF) 517 and a network slice selection function (NSSF) 515. A data network (DN) 507 is shown.

In FIG. 4 there are the following interfaces or references connecting the NFs:
  N1 is the interface between the UE and the AMF.
  N2 is the interface between the (R)AN and the AMF.
  N3 is the interface between the (R)AN and the UPF.
  N4 is the interface between the UPF and the SMF.
  N6 is the interface between the UPF and the DN.

The tasks of the AMF 511 may comprise one or more of the following (but are not limited thereto): registration management, connection management, reachability management, mobility management and various function relating to security and access management and authorization.

The AMF 511 may have part of the functionality of an MME (mobility management entity) in a 3G/4G network. The tasks of the NRF 519 may comprise one or more of the following (but are not limited thereto): service discovery functions, maintaining NF profiles of the available NF instances and their supported services.

In the 5G network as shown in FIG. 4, a 5G-AN 503 is responsible for initiating connectivity with the AMF 511. The AN may be a so called NextGen-RAN or Non-3GPP Inter-Working Function (N3IWF) or any other suitable access network. This requires the 5G-AN 503 to first obtain the AMF's 511 IP address.

Within E-UTRAN (evolved UMTS (universal mobile telecommunications system) terrestrial radio access network), the association of MMEs to a base station (e.g. eNB) may be static. Thus, the IP addresses of MMEs may be pre-configured to the eNB via operations, administration and management (OAM).

In 5G networks the association of the AMF 511 to the 5G-AN 503 nodes may be dynamic. For example, in virtualized deployments AMF 511 instances may be added or removed, for example, for scalability or planned maintenance. It has been proposed to have the option of pre-configuring the IP addresses of the AMF in a similar manner to the method used in 4G networks. This may be in addition to having the option that information about AMFs is made available in a domain name server (DNS) system. Information about a new AMF may be published and available in the DNS system. This is to allow a 5G-AN to discover an AMF and setup associations with the AMF if required.

Therefore, the 5G-AN 503 may obtain an IP address or endpoint(s) of the AMF 511 via DNS. This may be as an alternative to OAM.

One issue with current AMF discovery proposals by 5G-ANs is that when the AMF 511 attempts to register to the NRF 519, the AMF 511 does not currently provide information about its N2 connectivity (e.g. N2 IP addresses). This means that the NRF 519 cannot update the DNS (e.g. a collocated DNS) with the AMFs 511 available in an AMF Set.

Some embodiments may allow an AN to obtain the IP address of the AMF via a DNS look up.

The AMF 511, in addition to the current information that the AMF registers in the NRF 519, registers in the NRF 519, at least one of: the AMF 511 name, the AMF's 511 N2 interface addresses (e.g. IP addresses) and any other parameter that needs to be provisioned in the DNS 530. The NRF 519 is then capable of updating the DNS with the respective information. The DNS may be a standalone DNS or aDNS collocated with the NRF. This allows for example the NRF to update the DNS with NAPTR (Name Authority Pointer) records with NAPTR records for the available AMFs in AMF sets.

The NRF 519 APIs may be configured to enable the AMF to register its AMF name and/or N2 interface addresses (e.g. IP addresses) (to be provisioned in DNS). Alternatively or additionally, any other parameter that may need to be provisioned in the DNS may also be registered in the NRF. This may be part of the AMF profile which is registered in the NRF.

Figure 5:
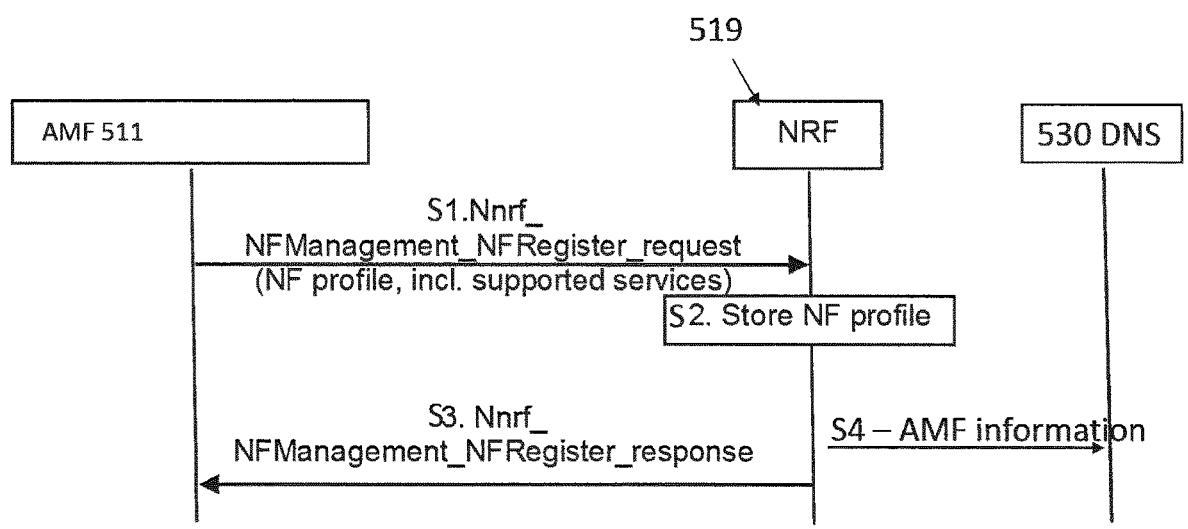
FIG. 5 shows an example signalling diagram.

Reference is made to FIG. 5 which shows a method of an embodiment.

In step S1, upon instantiation or activation, the AMF 511 registers its profile into the network repository function (NRF). This may be performed by sending a request with a NF profile where the NF is an AMF. This request may be a Nnrf_NFManagement_NFRegister_request or any suitable request. The AMF profile may comprise one or more of:
  general information for the AMF. For example this information may comprise the AMF name.
  an AMF set for an AMF.
  AMF N2 interface addresses (e.g. IP addresses).
  Any other parameter required by the DNS such as the order or the preference parameters for each AMF record.

In step S2, the NF profile is stored by the NRF 352.

In step S3, the NRF will provide a response. This response will indicate that the profile has been stored. This response may be a Nnrf_NFManagement_NFRegister_response or any suitable response.

In step S4, which may take place before, after or at the same time as step S3, the NRF sends AMF information to the DNS 530. This may allow the NRF 519 to update the DNS on its own (e.g. co-located DNS). This may allow the NRF 519 to update the DNS with NAPTR records for the available AMFs 511 in AMF Sets. It should be appreciated that in some embodiments, this message may be a request message and a response message may be sent from the DNS to the NRF confirming the updating of information.

In some embodiments, AMF information provided by the NRF to the DNS during one or more of registration, deregistration and profile changes. The NRF may thus update the DNS with the set of AMF instances available in an AMF Set, upon registration, deregistration or profile changes of AMF instances. This may be such that the DNS provides an accurate view of the AMF instances available in the network at any given time.

The update of the AMF N2 address is dealt by providing from the AMF information to the NRF. This information may comprise the AMF name and the updated address.

In the cases of de-registration, the NRF will cause the corresponding record to be deleted from the DNS.

In some embodiments, the "amfInfo" attribute stored in the NRF 519 (or other attributes of the NFService Profile) may alternatively or additionally comprise information that may be provisioned in the DNS.

This information may comprise:
  AMF Name (e.g. amf11.amf.5gc.mnc990.mcc311.3gppnetwork.org)
  AMF N2 interface IP addresses (e.g. 192.0.2.13, 2001:db8:0:2:0:0:0:0).

In some embodiments, an optional DNS (S-NAPTR) procedure is provided. This may enable the 5G-AN 503 (e.g. gNB, ng-eNB, N3IWF) to discover the AMFs 511 available within an AMF Set. The AMFs 511 available within an AMF Set may be provisioned within NAPTR records in the DNS, under a defined AMF Set FQDN.

Figure 6:
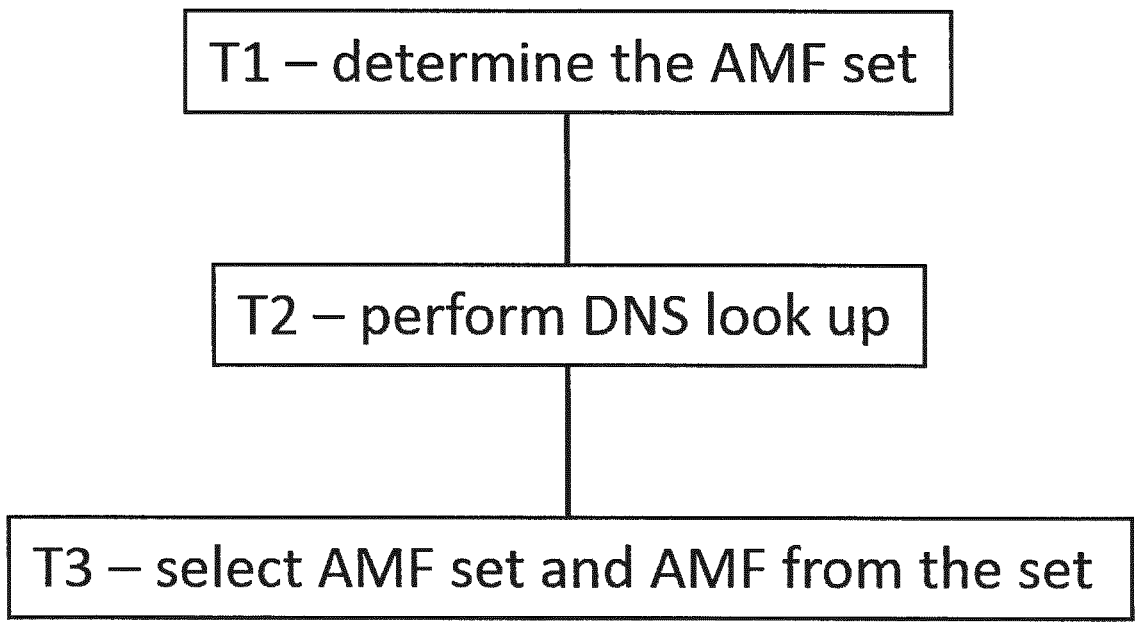
FIG. 6 shows an example of a flow chart illustrating actions that may be performed by an access network.

Reference is made by way of example to the method shown in FIG. 6.

In some embodiments the 5G-AN 503 may discover a specific AMF 511 from all AMFs available via DNS. In step T1, the 5G-AN 503 may compute or determine an AMF set first.

An AMF Set consists of some AMFs 511 that serve a given area and/or network slice. Multiple AMF Sets may be defined per AMF Region and Network Slice(s). The available AMFs 511 may for example be provisioned as name authority pointer (NAPTR) records in DNS under a new AMF Set fully qualified domain name (FQDN).

An AMF Set within an operator's network is identified by an AMF set ID, an AMF region ID, a mobile network code (MNC) and a mobile country code (MCC).

A subdomain name may be derived from the MNC and MCC by adding a label such as "amfset" to the beginning of the Home Network Realm/Domain. In other examples, any other suitable label may be used.

One example of an AMF set FQDN may be as follows:
set<AMFSetId>.region<AMFRegionId>.amfset.5gc.mnc<MNC>.mcc<MCC>0.3gppnetwork.org
  whereby
  <MNC>=3 digits
  <MCC>=3 digits If there are only 2 significant digits in the MNC, one "0" digit may be inserted at the left side to fill the 3 digits coding of MNC in the AMF set FQDN.

The <AMF set ID> and <AMF region ID> may be hexadecimal strings of the AMF set ID and AMF region ID respectively. If there are less than 2 significant digits in <AMF Region Id>, "0" digit(s) may be inserted at the left side to fill the 2 digits coding. If there are less than 3 significant digits in <AMF Set Id>, "0" digit(s) may be inserted at the left side to fill the 3 digits coding.

As an example only, the AMF Set FQDN for the AMF Set 1, AMF Region 48 (hexadecimal), MCC 345 and MNC 12 is coded as:

"set001.region48.5gc.mnc012.mcc345.pub.3gppnetwork.org"

It should be appreciated that in some embodiments, one or more of the above set information may be omitted. Alternatively or additionally, one or more alternative set related information may be provided.

It should be appreciated, that the order set out above is by way of example only and in other embodiments, a different ordering of the information be used.

It should be appreciated that the format of the information described above is by way of example only and in other embodiments, one of more of the information may have a different format. For example, different numbers of digits may be required.

In step T2, a DNS procedure is defined to allow the 5G-AN 503 to discover the AMFs 511 within an AMF Set. The AN will perform a DNS look up to determine the N2 interface IP addresses of the AMF using the respective names of the AMFs. This will provide the IP address(es)

In step T3, the 5G-AN 503 selects an AMF Set (where there is more than one set) and an AMF 511 from the AMF set.

As mentioned previously, the 5G-AN is responsible for initiating the SCTP connectivity and setting up the NG-C association with the AMF. This requires the 5G-AN to first obtain the AMF's IP address.

As mentioned previously, the AMFs 511 may be added or removed dynamically, for example, scalability or planned maintenance. The DNS procedure described now may be used by the 5G-AN 503 to discover the AMFs 511 available in an AMF Set.

The AMFs 511 available within an AMF set may be provisioned within NAPTR records in the DNS, under the AMF set FQDN. The may be, for example, with the Service Parameters "x-3gpp-amf:x-n2". Of course the parameters may be different in other embodiments and/or defined by different labels.

The 5G-AN may discover the AMFs available within an AMF set by constructing the AMF set FQDN identifying the AMF set of the AMFs to be discovered. The 5G-AN may initiate a straightforward NAPTR (S-NAPTR) procedure. This may be with an application unique string set to that AMF set FQDN, and with the "service parameters" set to, for example, "x-3gpp-amf:x-n2".

The 5G-AN 503 may obtain the AMF 511 IP endpoint(s) via DNS. The 5G-ANs 503 may discover available AMFs 511 e.g. based on one or more parameters. This parameters may be one or more of AMF region(s), AMF set ID(s) and tracking area identity or identities (TAI) that a respective 5G-AN may be serving.

The S-NAPTR procedure may output a list of host names (AMFs) each one having one or more of: a service; a protocol; a port; and a list of IPv4 and IPv6 addresses.

An example of an AMF region with 2 AMF sets will now be described.

A master file for this example has following content.

$ORIGIN 5gc.mnc990.mcc311.3gppnetwork.org.
;
$TTL 600; 10 minutes
;
$INCLUDE SOA_DB.txt
;
$INCLUDE AMFSET_DB.txt
;
; End of file The file containing the AMF Set records for this example will be AMFSET_DB.txt and has following NAPTR record content.

In this example, there are two AMF Sets 1 and 2, in AMF region 48 (hexadecimal), with two AMFs available in each AMF Set. (In other embodiments, there may less than two or more than two AMF sets available in a AMF region. There may be less than two or more than two AMFs in a AMF set.)

```
; ANF Set 1 of AMF Region 46
set001.region48.amfset
;  IN NAPTR order pref. flag service         regexp replacement
   IN NAPTR 100  999  "a"  "x-3gpp-amf:x-n2"  ""   topoff.amf11.amf
   IN NAPTR 100  999  "a"  "x-3gpp-amf:x-n2"  ""   topoff.amf12.amf
; AMF Set 2 of ANF Region 48
set002.region48.amfset
;  IN NAPTR order pref. flag service         regexp replacement
   IN NAPTR 100  999  "a"  "x-3gpp-amf:x-n2"  ""   topoff.amf21.amf
   IN NAPTR 100  999  "a"  "x-3gpp-amf:x-n2"  ""   topoff.amf22.amf
; AMFs IP addresses
;
topoff.amf11.amf           IN A 192.0.2.11
                           IN A 192.0.2.12
                           IN AAAA 2001:db8:0:0:0:0:0:0
                           IN AAAA 2001:db8:0:1:0:0:0:0
topoff.amf12.amf           IN A 192.0.2.13
                           IN A 192.0.2.14
                           IN AAAA 2001:db8:0:2:0:0:0:0
                           IN AAAA 2001:db6:0:3:0:0:0:0
topoff.amf21.amf           IN A 192.0.2.17
                           IN A 192.0.2.18
                           IN AAAA 2001:db8:0:6:0:0:0:0
                           IN AAAA 2001:db8:0:7:0:0:0:0
topoff.amf22.amf           IN A 192.0.2.19
                           IN A 192.0.2.110
                           IN AAAA 2001:db8:0:8:0:0:0:0
                           IN AAAA 2001:db8:0:9:0:0:0:0
; end of file
```

For each AMF in a set, its IP addresses are defined. AAAA records map a hostname to an IPv6 address whereas a A record maps a hostname to an IPv4 address. It should be appreciated that alternatively or additionally any other suitable DNS record type may be supported.

In some embodiments, there are defined extensions to the NRF 519 application programming interfaces (APIs) to enable the AMF 511 to register at least one of its AMF Name, N2 IP addresses (to be provisioned in DNS) and any other parameter that needs to be provisioned in the DNS. This may be registered to the NRF 519, as part of the AMF profile in the NRF 519 such as previously described. This may allow the NRF 519 to update the DNS on its own (e.g. co-located DNS). This may allow the NRF 519 to update the DNS with NAPTR records for the available AMFs 511 in AMF Sets.

In some embodiments, an 'app-service' name and 'app-protocol' name may be defined to identify the N2 interface of the AMF 511. The 'app-service' name identify 3GPP node type and 'app-protocol' identify 3GPP interfaces. This may differ from a more common usage of S-NAPTR where app-protocol is used for transport protocol. Type of nodes (i.e. PGW, SGW, SGSN, MME, MSC Server etc.) and interfaces (i.e. 511, S5, S8, Sv, etc.) follow the standard names from for example 3GPP TS 23.401, 3GPP TS 29.060 and 3GPP TS 23.216 with prefix "x-" added. In Table 19.4.3.1 of 3GPP TS 29.303 (as shown below), the AMF 'app-service' name and 'app-protocol' name are provided. For example, the app-service of 'x-3gpp-amf' with app-protocol x-n2 identifies the AMF N2 interface service.

| Description | IETF RFC 3958 section 6.5 'app-service' name | IETF RFC 3958 section 6.5 'app-protocol' name |
|---|---|---|
| PGW and interface types supported by the PGW | x-3gpp-pgw | x-s5-gtp, x-s5-pmip, x-s8-gtp, x-s8-pmip, x-s2a-pmip, x-s2a-mipv4, x-s2a-gtp, x-s2b-pmip, x-s2b-gtp, x-s2c-dsmip, x-gn, x-gp. |
| SGW and interface types supported by the SGW | x-3gpp-sgw | x-s5-gtp, x-s5-pmip, x-s8-gtp, x-s8-pmip, x-s11, x-s12, x-s4, x-s1-u, x-s2a-pmip, x-s2b-pmip. |
| GGSN | x-3gpp-ggsn | x-gn, x-gp |
| SGSN | x-3gpp-sgsn | x-gn, x-gp, x-s4, x-s3, x-s16, x-sv, x-nqprime |
| MME and interface types supported by the MME | x-3gpp-mme | x-s10, x-s11, x-s3, x-s6a, x-s1-mme, x-gn, x-gp, x-sv, x-nq. |
| MSC Server | x-3gpp-msc | x-sv |
| UP function | x-3gpp-upf | x-sxa, x-sxb, x-sxc |
| AMF | x-3gpp-amf | x-n2 |

In some embodiments, the "amfInfo" data type may be provided with a n2InterfaceAmfInfo attribute. An example table of the AMF info data is set out below.

| Attribute name | Data type | P | Cardinality | Description |
|---|---|---|---|---|
| amfRegionId | string | M | 1 | AMF region identifier |
| amfSetId | string | M | 1 | AMF set identifier. |
| guamiList | array(Guami) | M | 1..N | List of supported GUAMIs |
| taiList | array(Tai) | O | 0..N | The list of TAIs the AMF can serve |
| backupInfoAmfFailure | array(Guami) | O | 0..N | List of GUAMIs for which the AMF acts as a backup for AMF failure |
| backupInfoAmfRemoval | array(Guami) | O | 0..N | List of GUAMIs for which the AMF acts as a backup for planned AMF removal |
| n2InterfaceAmfInfo | N2InterfaceAmfInfo | O | 0..1 | N2 interface information of the AMF. This information needs not be sent in NF Discovery responses. It may be used by the NRF to update the DNS for AMF discovery by the 5G Access Network. |

The N2 interface information of the AMF 511 may be used by the NRF 519 to update the DNS for AMF discovery by the 5G-AN 503. As an example only, the definition of the N2InterfaceAmfInfo may be as follows.

| Attribute name | Data type | P | Cardinality | Description |
|---|---|---|---|---|
| ipv4EndpointAddress | array(Ipv4Addr) | C | 0..N | Available AMF endpoint IPv4 address(es) for N2 (see NOTE 1) |
| ipv6EndpointAddress | array(Ipv6Addr) | C | 0..N | Available AMF endpoint IPv6 address(es) for N2 (see NOTE 1) |
| amfFqdn | Fqdn | O | 0..1 | AMF FQDN for N2 |

At least one of the addressing parameters (ipv4address or ipv6adress) maybe included.

It is also noted herein that while the above describes example embodiments, there are several variations and modifications which may be made to the disclosed solution without departing from the scope of the present invention.

Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus in a network repository function, comprising:
at least one processor; and
at least one memory including computer program code;
the at least one memory and the computer program code being configured to, with the at least one processor, cause the apparatus at least to perform:
receiving, during one of a network function registration process and a network function update process, information for an access and mobility management function, wherein said information is received during one of a network function registration process and a network function update process; and
causing at least a part of said information for said access and mobility management function to be stored at a domain name server.

2. The apparatus as claimed in claim 1, wherein said information comprises address information for an interface of said access and mobility management function towards an access network.

3. The apparatus as claimed in claim 2, wherein said address information comprises one or more IP addresses.

4. The apparatus as claimed in claim 1, wherein said at least one memory and computer program code are configured, with said at least one processor, to cause the apparatus to further perform causing information on a set of access and mobility management functions to be provided to said domain name server such that said domain name server has information on available access and mobility management functions of said set.

5. The apparatus as claimed in claim 1, wherein said information is received in a message from said access and mobility management function.

6. The apparatus as claimed in claim 1, wherein said information is provided as part of profile information of said access and mobility management function.

7. An apparatus in an access and mobility management function, comprising:
at least one processor; and
at least one memory including computer program code;
the at least one memory and the computer program code being configured to, with the at least one processor, cause the apparatus at least to perform:
causing information for said access and mobility management function to be transmitted to a network repository function, said information comprising address information of an interface of said access and mobility management function, said interface being towards an access network, and name information of said access and mobility management function, wherein said address information comprises at least two IP addresses.

8. The apparatus as claimed in claim 7, wherein said information is provided during one of a network function registration process, a network function de-registration process and a network function update process.

9. The apparatus as claimed in claim 7, wherein said information is provided as part of profile information of said access and mobility management function.

10. An apparatus in an access network, comprising:
at least one processor; and
at least one memory including computer program code;
the at least one memory and the computer program code being configured to, with the at least one processor, cause the apparatus at least to perform:
causing a request to be sent to a domain name server for address information for a plurality of access and mobility management functions, said address information being for respective interfaces of respective access and mobility management functions, each interface being towards said access network; and
receiving a response with said address information associated with a plurality of access and mobility management functions.

11. The apparatus as claimed in claim 10, wherein:
said plurality of access and mobility management functions comprises a set of access and mobility management functions, and
said at least one memory and computer program code are configured, with said at least one processor, to cause the apparatus to further perform determining said set of access and mobility management functions.

12. The apparatus as claimed in claim 10, wherein said request is for initiating a straight forward name authority pointer procedure for said set of access and mobility management functions.

13. The apparatus as claimed in claim 12, wherein said response comprises name authority pointer records comprising said address information for respective access and mobility management functions of said set.

14. The apparatus as claimed in claim 12, wherein said response comprises name authority pointer records comprising said address information for respective access and mobility management functions which are currently available in said set.

15. The apparatus as claimed in claim 10, wherein said at least one memory and computer program code are configured, with said at least one processor, to cause the apparatus to further perform selecting an access and mobility management function from said plurality of an access and mobility management function for which address information is received.

16. A method, comprising:

receiving, during one of a network function registration process and a network function update process, information in a network repository function for an access and mobility management function, wherein said information is received during one of a network function registration process and a network function update process; and causing, by said network repository function, at least a part of said information for said access and mobility management function to be stored at a domain name server.

17. A method, comprising:

causing, in an access and mobility management function, information for said access and mobility management function to be transmitted to a network repository function, said information comprising address information of an interface of said access and mobility management function, said interface being towards an access network wherein said address information comprises at least two IP addresses.

18. A method, comprising:

causing, in an access network, a request to be sent to a domain name server for address information for a plurality access and mobility management functions, said address information being for respective interfaces of respective access and mobility management functions, each interface being towards said access network; and receiving a response with said address information associated with a plurality of access and mobility management functions.

19. A computer program embodied on a non-transitory computer-readable medium, said computer program comprising computer executable code which, when executed in hardware causes the hardware to perform the method of claim 16.

\* \* \* \* \*